United States Patent [19]
Bley

[11] 3,984,850
[45] Oct. 5, 1976

[54] SEQUENCE CAMERA
[75] Inventor: Frederick O. Bley, Reston, Va.
[73] Assignee: Optical & Electronic Research, Inc., Reston, Va.
[22] Filed: May 18, 1972
[21] Appl. No.: 254,775.

Related U.S. Application Data
[63] Continuation of Ser. No. 40,516, May 26, 1970, abandoned.

[52] U.S. Cl. .............................................. 354/125
[51] Int. Cl.² ............................................ G03B 1/00
[58] Field of Search .................... 95/115, 38, 37; 354/125

[56] References Cited
UNITED STATES PATENTS

| | | | |
|---|---|---|---|
| 703,858 | 7/1902 | Vautier | 95/115 |
| 1,552,449 | 9/1925 | Roach | 95/115 |
| 2,531,783 | 11/1950 | Mosca | 95/115 |
| 3,194,112 | 7/1965 | Back | 95/37 |
| 3,261,259 | 7/1966 | Baptie | 95/37 |
| 3,282,186 | 11/1966 | Niccolls | 95/38 |

FOREIGN PATENTS OR APPLICATIONS
756,521  9/1956  United Kingdom.................. 95/115

Primary Examiner—John Gonzales
Attorney, Agent, or Firm—Pollock, Vande Sande & Priddy

[57] ABSTRACT

A camera capable of taking a plurality of different exposures on a single frame of film using only one lens-shutter combination. A beam shifting assembly rotates to a plurality of different positions to distribute the images sequentially, thus enabling the camera to provide a plurality of different exposures on a single frame of film. Double-exposure prevention is provided both between the different images on each frame and between the different frames. The camera is provided with a "Polaroid" type back so as to enable almost simultaneous developing of the frames, once taken. The camera also includes an aiming light to facilitate proper subject positioning. In addition a strobe socket is provided for strobe energization when using low-speed film.

4 Claims, 7 Drawing Figures

INVENTOR
Frederick O. Bley

BY Robert R. Priddy
ATTORNEY

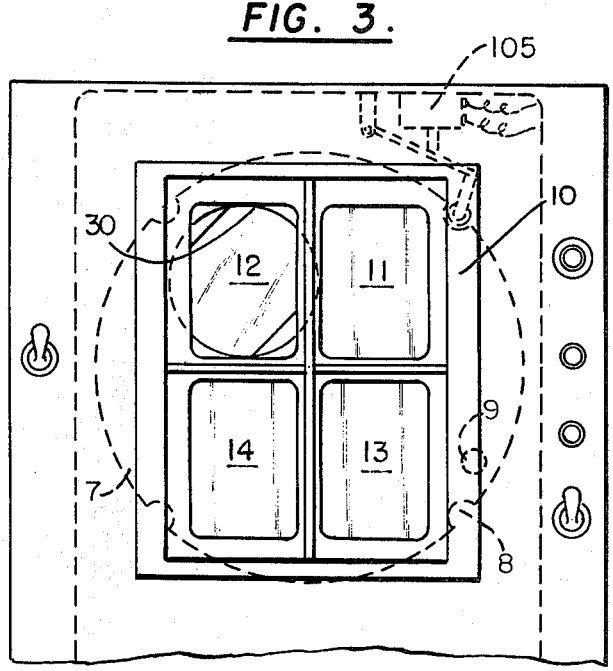
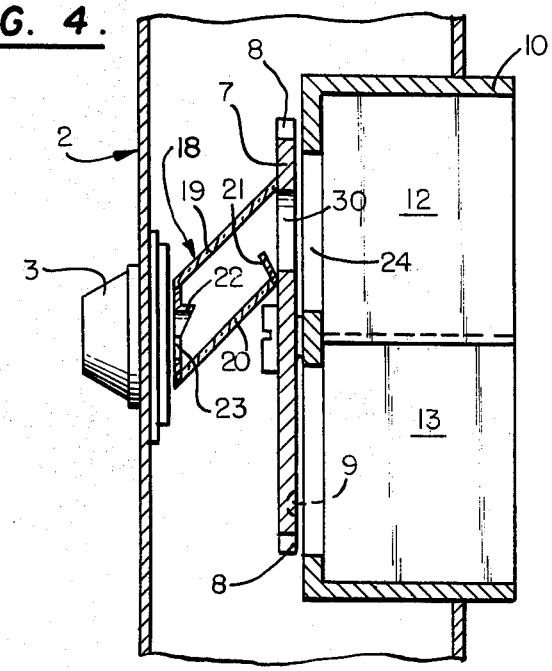
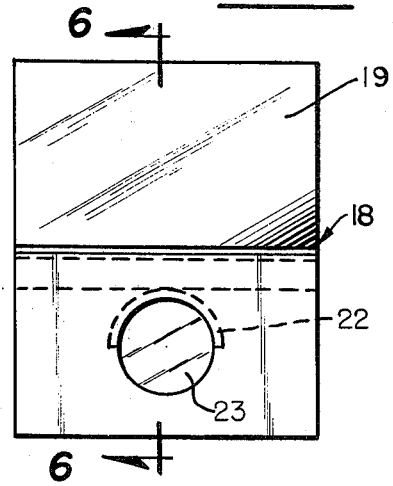
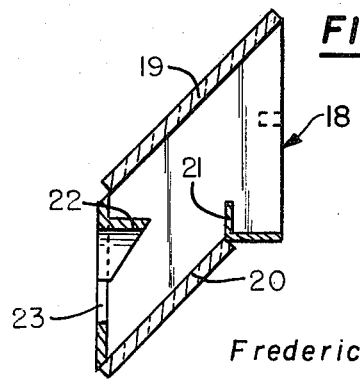

INVENTOR
Frederick O. Bley

BY Robert R. Priddy
ATTORNEY

SEQUENCE CAMERA

This is a continuation, of application Ser. No. 40,516, filed May 26, 1970, now abandoned.

The present invention is directed at a camera which is particularly useful in the making of photo-identification cards. It has been found in this field that it is particularly efficient, for a number of reasons, to use a camera which is capable of recording a plurality of images on a single film frame. That is, the camera of this invention is capable of exposing a number of different images on a single film frame. The photo portion of a photo-identification card is generally smaller than the frame size of any common film now in use. Therefore if only one exposure was used per frame, there would be resultant loss of useful area on the film. The ability to provide a number of different exposures on a single film frame, of course, also saves film cost. The camera of this invention therefore, is designed to provide a plurality of different images on a single film frame.

Prior art attempts to achieve the results of the present invention have fallen short of success. One type of solution advanced for providing multiexposure images on a single film frame has been to utilize a plurality of lenses, equal in number to the number of different exposures desired per frame, with a single shutter. This solution is wasteful of apparatus in that it does not efficiently utilize the multiple lens-shutter combinations. The use of a plurality of lenses also necessarily requires each lens to be in a different location from the others. This obviously complicates the optical path in that it requires compensation since the subject, lens, film plane path is different for each lens. Further the provision of four lenses results either in a bulky package if four high quality lenses are used, or a reasonable sized package if lower quality lenses are used.

Other prior art attempts specifically directed at producing a multi-image per frame camera have resulted in extremely complex optical-mechanical arrangements. These were needed, in the prior art, to shift the image from the single lens to the different positions corresponding to the different portions of the film frame. As is well known, mechanical requirements in optical systems are extremely severe. As the amount of mechanical apparatus required between the film plane and lens increases, especially if that apparatus is movable, the chances of misregistering the image on the film plane increases. The severe mechanical requirements for optical systems also tends to increase the cost of producing such complex mechanical-optical systems and further increases the cost of maintaining them in proper operating condition.

It is, therefore, an object of the present invention to provide a camera capable of taking a plurality of separate and different exposures on a single frame of film. Another object of the invention is to provide a camera of this type which minimizes the mechanical elements required to shift the image from one portion of the film frame to another. It is a further object of the invention to provide a camera of the type described which employs only one shutter-lens combination.

A further object of the invention is to provide a multiimage per frame camera which provides double exposure protection, not only such protection between different images on a particular frame, but also double exposure prevention between film frames.

A further object of the invention is to provide a camera of the type described above which is capable of taking color or black and white film.

A further object of the invention is to fulfill the objectives of a camera described above with the optical elements so arranged mechanically as to minimize the possibilities of optical misregistration of the resultant image on the film frame. It is another object of the present invention to provide a camera of the type described above which is capable of using "Polaroid" film so as to give substantial instantaneously developed pictures.

BRIEF DESCRIPTION OF THE DRAWINGS

FIG. 3 is a rear view of the camera as seen from the film plane, showing some of the major elements.

FIG. 4 is a section of FIG. 2 taken on lines 4—4.

FIG. 5 is a front view of the beam shifting assembly.

FIG. 6 is a cross section of the beam shifting assembly taken on lines 6—6 of FIG. 5.

BACKGROUND

Figure 1:
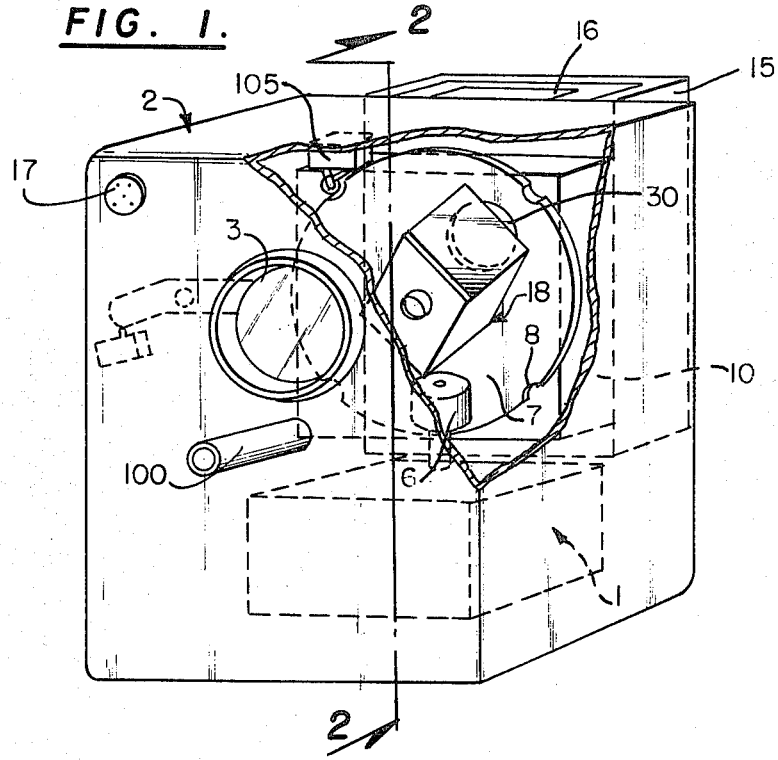
FIG. 1 is a isometric view, partially broken away, showing the major elements of the sequence camera.

A camera designed to provide more than one image on each film frame must be capable of segregating portions of the film frame to be exposed while protecting the remaining portions of the film frame from exposure. In addition, the portion of the film that will be exposed in any one configuration of the camera elements must be capable of being varied, that is it is necessary to change the portion of the film frame which is exposed, if the entire film frame is to be utilized. In providing these capabilities, the prior art discloses two alternative solutions.

In one solution a plurality of lenses are employed, each directed at a different portion of the film frame. With this arrangement one lens is operative at any one time, and the internal elements of the camera segregate the portion of the film frame to be exposed from the remaining portions of the film frame. Cameras of this type employ only a single shutter, inasmuch as the use of four separate shutters is prohibited by space requirements. This requires further apparatus to prevent recordation of images from all the lenses when the shutter is tripped. Although such apparatus has been provided its defect lies in an inability to prevent double exposures.

The other alternative approach has been to provide a mechanical arrangement designed to vary the optical path between successive exposures. In this fashion the image to be photographed can be shifted to different portions of the film frame. At the same time the film portions must be segregated, one from another, so as to expose only one portion of the film at any one time. In this fashion, after each exposure, the mechanical elements are shifted so as to expose a different portion of the film frame. The drawback with solutions of this type relate to the manner in which the optical path has been shifted from one portion of the film frame to another. Generally, a complex arrangement of levers and linkages has been employed to vary the position of a plurality of lenses and mirrors so as to shift the optical path from one portion of a film frame to the next. As the camera is used, wear due to shifting of mechanical linkages results in misregistration of the image for any particular portion of the film frame. Ultimately, after sufficient wear, registration errors become too great to be accommodated by camera tolerances, and the camera becomes unusable.

The present invention overcomes these drawbacks by doing away with all mechanical linkages and levers. As the image to be recorded enters or passes the shutter plane a pair of mirrors, disposed in a beam shifting assembly, shift the axis of the optical path in both the vertical and horizontal directions so that the image exiting from the beam shifting assembly remains parallel to the original optical path. Internal camera elements provide light segregation so that only one of a plurality of film frame portions is exposed. The beam shifting assembly, used for shifting the optical path, is mounted on a rotatable wheel. In the embodiment disclosed herein, the camera is capable of separately exposing four images per each film frame. Therefore, the internal camera elements segregate each film frame into four portions. The wheel, carrying the beam shifting assembly, then sequentially assumes four different positions to expose each portion of the film frame. In this manner, the image derived from the lens is shifted, in four different steps, to four different portions of the film frame. After each portion of the film frame has been exposed it is then necessary to remove the now fully exposed film frame and introduce a new frame into the camera.

Inasmuch as any camera constructed in accordance with the principles of this invention is designed to record images that have been shifted by the beam shifting assembly, such cameras must be designed to insure that the only light which reaches the film plane has in fact been reflected by both elements of the beam shifting assembly. If any straight-line light path exists from shutter plane to film plane or if a light path exists from shutter plane to film plane which includes only a portion of the beam shifting assembly the image recorded on the film will be distorted. In accordance with these requirements, in a camera constructed in accordance with the principles of the present invention, it has been found necessary to provide a plurality of light barriers to insure that no spurious light path exists. Of course, it may be possible to vary the number or even existence of the light barriers mentioned above in constructing a camera in accordance with the principles of the present invention so long as no spurious light paths exist to distort the image recorded at the film plane.

The control system of the camera described herein is designed to enable the camera to record a plurality of different images, each on a different portion of a single film frame. This is accomplished rotating the wheel carrying the beam shifting assembly to a plurality of different positions corresponding to the plurality of different portions of the film frame. Microswitches and detents cooperate to energize a motor to drive the wheel and stop the motor and wheel at the proper position. The control system is also designed to preclude operation of the shutter at any time when an unexposed portion of film frame is not available. The control system is further designed to energize an aiming light to insure proper positioning of subject and camera prior to energizing the shutter. A supplementary light source is also provided, and is energized by the control system at the proper time, when the use of low-speed film is indicated to the control system. The supplementary light source is energized and synchronized with the shutter so that it is energized only when the shutter is fully open. In addition, the control system prevents double exposures between film frames. This is accomplished by locking the shutter after a plurality of different images have been recorded, entirely filling one film frame, until a new film frame is properly positioned.

DETAILED DESCRIPTION OF THE DRAWINGS

Figure 2:
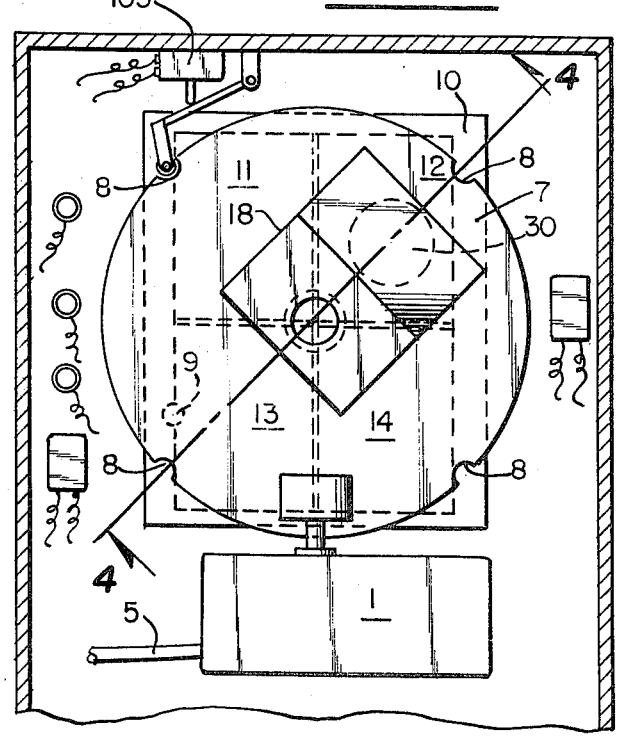
FIG. 2 is a front view of the camera as seen from directly behind the shutter plane.

FIG. 1 shows a front isometric view, partially broken away. Mounted on the exterior of camera housing 2 are aiming light 100, lens 3, and "Polaroid" film back 15. In the interior of the camera housing 2 there is motor 1 driving frictional wheel 6. Wheel 6 is in frictional driving engagement with rotatable wheel 7. A plurality of detents 8 are provided on wheel 7 for cooperation with microswitch 105. In the disclosed embodiment, providing four film exposures per frame, wheel 7 is provided with four detents 8. The detents are arranged on the periphery of the wheel for coaction with microswitch 105. On the rear surface of wheel 7 an additional detent 9 is provided to cooperate with another microswitch, not shown. Detent 9 can be seen in FIG. 3. Light-tight container 10 is operably associated with wheel 7 and internally provides four separate light-tight compartments, 11, 12, 13, and 14. The arrangement of light-tight compartments is shown in FIGS. 2, 3, and 4. Unexposed film is housed in Polaroid film back 15. As each film frame is fully exposed, it is withdrawn from film back 15 through closure 16. Closure 16 cooperates with microswitch 93, not shown. Film back 15 is operably associated with light-tight container 10 so that its four compartments 11, 12, 13, and 14 prohibit light leakage in the film plane housed in film back 15. Beam shifting assembly 18 is shown mounted on wheel 7 for rotatable movement. Supplementary light source socket 17 is shown in the upper left hand corner of camera housing 2. In addition, microswitch 109 is operably associated with shutter 3 to sense its position.

FIG. 3 shows in more detail the arrangement of light compartment 10, with its associated portions 11, 12, 13, and 14 and its relation to rotatable wheel 7. As shown in FIG. 3 the relative location of wheel 7 and light exit 30 from beam shifting assembly 18 would expose a portion of film located adjacent to compartment 12. The explanation of the operation of the camera, below, will illustrate how the detents 8 control the operative positioning of wheel 7 for image recordation. The detents 8 are spaced apart from each other so that the angular distance from the first detent to the second is 75°, the distance from the second to the third is 105°, the distance from the third to the fourth is 75°, and the distance from the fourth to the first is 105°. With the camera in the upright position the detent for light-tight compartment 11 is at an angle of approximately 150° from the horizontal.

FIGS. 2, 3, and 4 show how the optical path of the image is shifted by beam shifting assembly 18 as wheel 7 rotates to a plurality of different positions corresponding to compartments 11, 12, 13, and 14 of light container 10. As shown in FIG. 6 beam shifting assembly 18 comprises a pair of mirrors 19 and 20 mounted parallel to each other. Beam shifting assembly 18 further comprises an entry path for light 23 and an exit path at 30. The plurality of light barriers 21 and 22 are provided to insure that no spurious light paths exist to distort the image recorded on the film plane. As shown in FIG. 6 one of the light barriers 22 is mounted on said beam shifting assembly adjacent the image beam entrance plane. Circular light barrier 22 as shown in FIG. 5, is mounted perpendicular to the image beam entrance plane, the plane through which the image beam enters the beam shifting assembly. Planar light barrier 21 is mounted adjacent the image beam exit plane of the beam shifting assembly and substantially parallel therewith. As shown in FIG. 4 the image to be recorded on the film plane enters the camera through lens 3. The image passes through beam shifting assembly 18 entry 23 and is shifted by mirrors 20 and 19 and exits through hole 30 in wheel 7. The image passes into light container 10, and as shown it would enter light compartment 12 and then impinges on the film.

Figure 7:
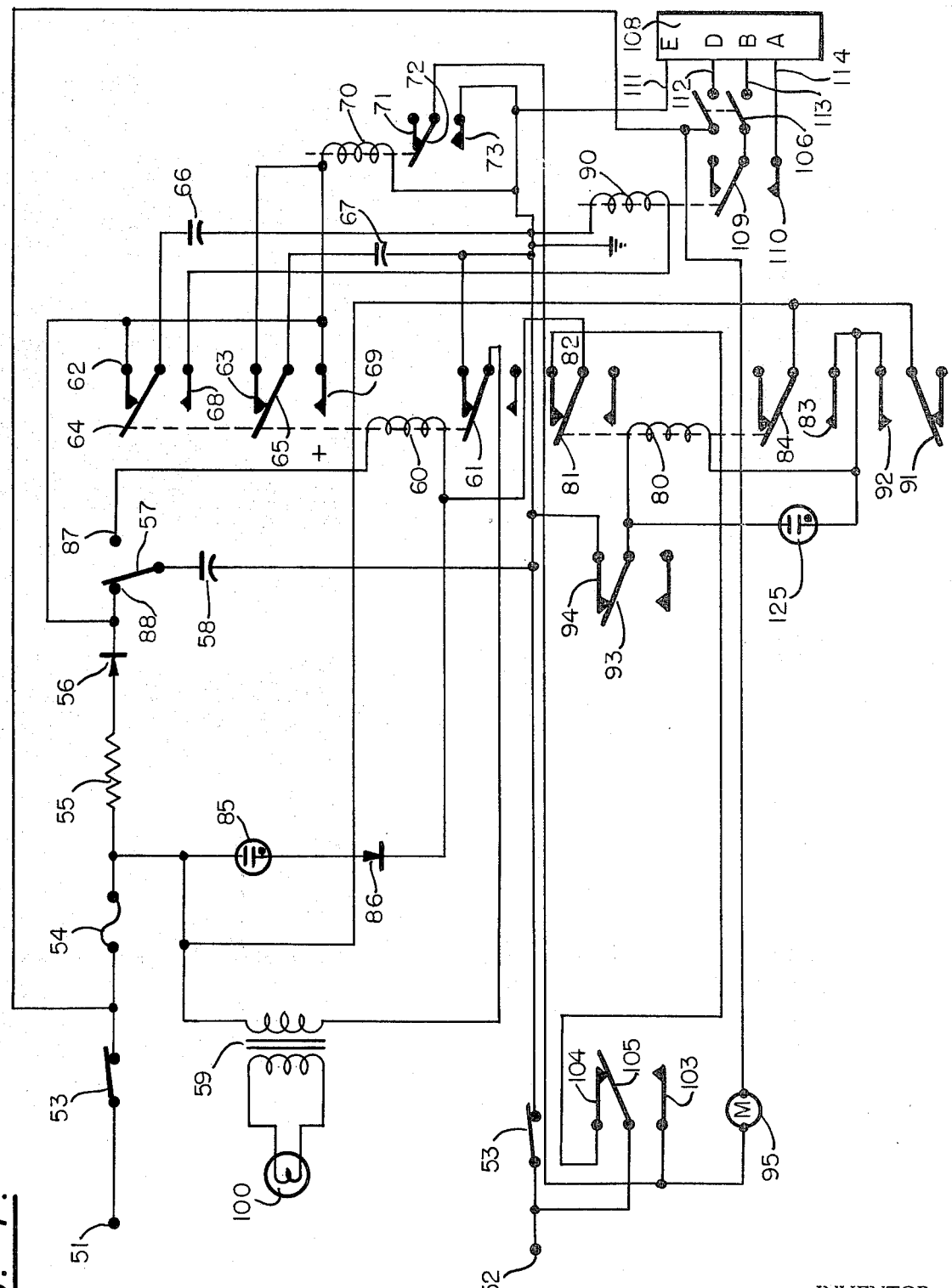
FIG. 7 is a schematic diagram of the control circuit of the present invention.

FIG. 7 shows electrical control circuit provided in the camera. Terminals 51 and 52 provide a source of power, ordinarily coupled to the conventional 120 volt power source. Connected to terminal 51 is on-off switch 53, in series with fuse 54 and resistor 55, diode 56, shutter release contact 88, capacitor 58 through the other portion of on-off switch 53 to power source terminal 52. The junction of fuse 54 and resistor 55 is connected to one terminal of the primary winding of transformer 59. The other terminal of the primary windings of transformer 59 is connected through front contact 61 of relay 60 to power source terminal 52 through on-off switch 53. The secondary of transformer 59 provides a power source for aiming light 100. Also connected to the junction of fuse 54 and resistor 55 is neon lamp 85 which is connected to diode 86 which connects to one terminal of relay coil 60. The other terminal of relay coil 60 is connected to shutter release switch terminal 87. Connected to one terminal of diode 56 and shutter release switch terminal 88 is front contact 62 and back contact 69 of relay 60. Transfer contact 64 is connected to capacitor 66, the other side of which is connected through on-off switch 53 to terminal 52 of the power source. The transfer contact 65 is connected through capacitor 67 to and through on-off switch 53 to terminal 52 of power source. Front contact 63 is connected through relay coil 70 and through on-off switch 53 to the other terminal of the power source 52. Back contact 68 is connected through shutter coil 90 through on-off switch 53 to power source terminal 52. Back contact 73 is connected through on-off switch 53 to the other power source terminal 52. Transfer contact 72 is connected through motor 95 to the junction of fuse 54 and on-off switch 53. Also connected to the common junction of fuse 54 and resistor 55 is transfer contact 84, and microswitch 91. Microswitch contact 92 is connected to back contact 83, one terminal of coil 80 and one side of neon lamp 125. The other terminal of neon lamp 125 is connected to the other terminal of coil 80 and to one terminal of microswitch 93. The other microswitch terminal 94 is connected through on-off switch 53 to the other power source terminal 52. Front contact 82 is connected to one terminal 104 of microswitch 105. The transfer contact 105 of the microswitch is connected to power source terminal 52. The other terminal 103 of microswitch 105 is connected to one terminal of motor 95. Terminal 111 of supplementary light source module 108 is connected through on-off switch 53 to the other power source terminal 52. Terminal 112 is connected through color-black and white switch 106 to the junction of fuse 54 and on-off switch 53. Terminal 113 is connected through color-black and white switch 106 to the transfer contact 109 of relay 90. Back contact 110 of relay 90 is connected to terminal 114 of supplementary light source module 108.

OPERATION

In operation, when on-off switch 53 is energized, all relay contacts and switches will be in the positions shown in FIG. 7. Transformer 59 is energized through fuse 54 and contact 61 of relay 60. This provides energization of aiming light 100 so as to enable proper positioning of the camera and subject prior to exposing a portion of the film frame. A circuit is also completed, through fuse 54, resistor 55, diode 56, contacts 62 and 64 of relay 60 through capacitor 66 to charge this capacitor. Another circuit is completed through contacts 88 and 57 of shutter release switch to charge capacitor 58. For purposes of this discussion we will assume that no pictures have yet been taken and that relay 80, which provides for double exposure prevention between film frames, is deenergized. These assumptions will be borne out as the description of the operation progresses. When shutter release switch 57 is closed, capacitor 58 will discharge through relay 60, energizing this relay. Coil 60 is energized by capacitor 58 through shutter release switch 57, terminal 87, coil 60, transfer contact 81 of relay 80, front contact 82, microswitch 105 and front contact 104. Transfer contacts 61, 64, and 65 will accordingly change positions, and this will have the following effects. Transfer contact 61 moving toward the back contact will open the circuit for transformer primary 59 and therefore deenergize the aiming light. When transfer contact 64 engages back contact 68, capacitor 66 will discharge through shutter solenoid 90. At this time shutter opens and the image entering lens 3 is recorded on the portion of the film frame operably associated with the lens through beam shifting assembly 18. When transfer contact 65 engages its back contact 69 it allows capacitor 67 to charge. Capacitor 58 discharging through relay coil 60 will discharge in a period of time determined by the size of the capacitor and the resistance of relay coil 60. Subsequent to the discharge, relay coil 60 becomes deenergized moving contacts 61, 64, and 65 to a position shown in FIG. 7. Transfer contact 61 moving to its back position reenergizes aiming light 100 through transformer 59. Transfer contact 64 engaging front contact 62 again provides a circuit to charge capacitor 66. Transfer contact 65 moving to its front contact 63 provides a discharge path for the now charged capacitor 67 through transport relay coil 70. The energization of transport coil 70 moves transfer contact 72 to its back contact 73 providing an energization circuit for motor 95 over a circuit which includes on-off switch 53, motor 95 through transfer contact 72, back contact 73 through on-off switch 53. Energization of motor 95 causes wheel 7 to rotate through the action of frictional driving wheel 6. As the wheel 7 begins to move, microswitch 105 closes with its back contact 103 through the action of the follower moving out of a detent 8 in which it had been resting. This completes a circuit for motor 95 when relay 70 is deenergized as capacitor 67 discharges. During the time microswitch 105 is connected to its back contact 103 relay 60 cannot now be energized. Energization of coil 60 is prevented inasmuch as the energization circuit includes microswitch 105 and front contact 104, since microswitch 105 is now in contact with back contact 103 this path is precluded. During this time operation of shutter release switch 57 therefore can have no effect, and this prevents energization of shutter coil 90 when the camera is not in position to accept an image. When the wheel 7 has moved to another one of its positions the follower of microswitch 105 enters the appropriate detent 8 causing microswitch 105 to rise to its front position and close contact 104. Consequently motor 95 is now deenergized inasmuch as its circuit has been opened. Further relay coil 60 may now be energized by again closing shutter release switch 57 inasmuch as its energization path is now complete.

In this manner three additional images can be exposed. Subsequent to shutter operation, as has been explained above, the wheel 7 moves to its next operative position. During the time that wheel 7 is in motion, microswitch 105 prevents improper shutter operation. After the fourth picture has been taken and while the rotatable wheel 7 is rotating between the fourth detent 8 and the first detent 8 microswitch 91 encounters detent 9, shown in FIG. 3, raising microswitch 91 to close its front contact 92. This causes relay coil 80 to be energized over a circuit including on-off switch 53, fuse 54, front contact 92 of microswitch 91, relay coil 80, and microswitch 93 and its front contact 94 through on-off switch 53. Energization of relay coil 80, although occurring only momentarily, causes transfer contacts 81 and 84 to move to their back contact position. Transfer contact 84 and back contact 83 provide a holding circuit for relay coil 80, which continues to be energized after microswitch 91 moves off detent 9 and returns to its back contact position. Transfer contact 81 moving to its back contact position now precludes operation of coil 60, inasmuch as front contact 82 is included in the energization circuit for coil 60. This again prevents actuation of shutter release switch 57 from having any effect on shutter solenoid 90. In this condition neon lamp 125, in parallel with relay coil 80, is energized to indicate that the film frame in the camera has been exposed completely and a new film frame must be moved into an operative position. To effect this, film back 15 is opened through closure 16 to remove the now exposed film and position a fresh frame for exposure. Opening of closure 16 operates microswitch 93 to its back contact position, thus opening the energization circuit for relay coil 80. This causes transfer contacts 81 and 84 to move to their front contact positions. Transfer contact 84 moving to its front contact position opens the energization circuit for relay coil 80 so that when closure 16 is closed and microswitch 93 moves back to its front contact 94, relay 80 will not be again energized. Transfer contact 81 moving to its front contact 82 now enables relay coil 60 to be energized by the actuation of shutter release 57. Therefore, until a fresh frame has been properly positioned actuation of shutter release switch 57 will have no effect on shutter solenoid 90, thereby preventing a double exposure of a fully exposed frame.

Switch 106 indicates to the control circuit if low-speed film, such as color film, is being used. When the use of low-speed film is indicated, by the closure of switch 106, supplementary light source module 108 is enabled to provide the necessary power for a supplementary light source in socket 17. The energization circuit for supplementary light source module 108 is provided through on-off switch 53, switch 106 to terminal 112 of supplementary light source module 108. When shutter solenoid coil 90 is energized, microswitch 109 moves to its back contact position 110 thus completing a circuit from supplementary light source module terminal 114 through the back contact 110, transfer contact 109 and closed switch 106 to supplementary light source module terminal 113. Supplementary light source module terminal 111 is connected through on-off switch 53 to the power source terminal. Thus when microswitch 109 senses the shutter fully opened, the supplementary light source module 108 is energized.

Neon lamp 85 and diode 86 are connected in parallel with relay coil 60, and thus indicate when an energization circuit is available for relay coil 60 by the energization of neon lamp 85.

Those skilled in the art will readily perceive that a number of modifications can be made to the embodiment of the camera disclosed herein without departing from the principles or scope of the present invention. For instance, the number of different portions of a film frame can be varied from the number of four which is specifically disclosed herein. The scope of the present invention should be construed from the claims appended hereto and should not be limited to the specific details disclosed above.

What is claimed is:

1. In a camera capable of separately exposing a plurality of portions of a single film frame laying in a film plane,
   a lens,
   a shutter and shutter actuation means,
   beam shifting means comprising a pair of mirrors associated with said lens and defining an image beam entrance plane through which an image beam enters said beam shifting means from said lens, and an image beam exit plane through which said image beam exits from said beam shifting means, said beam shifting means shifting said exit image beam with respect to said entering image beam,
   light barrier means mounted on said beam shifting means and adjacent said entrance and exit planes of said beam shifting means preventing any image beam from reaching said film plane which is not reflected by both said pair of mirrors,
   said beam shifting means being mounted on rotatable means for rotatable movement about an axis through said lens to a plurality of different positions,
   an electrical motor operatively engaging said rotatable means for rotation thereof,
   a plurality of detents in said rotatable means, equal in number to said plurality of positions of said beam shifting means and corresponding thereto,
   means segregating said film frame into a plurality of light-tight portions,
   each of said portions corresponding to one of said plurality of different positions of said beam shifting means,
   a circuit for energizing said electrical motor including sensing means,
   said sensing means operative to deenergize said motor when said sensing means senses one of said plurality of detents,
   and means for precluding the operation of said shutter accuation means when said sensing means does not sense one of said plurality of detents,
   an additional detent in said rotatable means, second sensing means positioned so as to sense said additional detent subsequent to a plurality of exposures, equal in number to said plurality of detents, and memory means, normally in one condition, and operative to a second condition to indicate the sensing of said additional detent.

2. The camera of claim 1 which further includes means operatively associating said memory means and said shutter accuation means to preclude operation of said shutter accuation means when said memory means is in its second condition.

3. The camera of claim 2 which further indicates means to preclude energization of said electrical motor when said memory means is in its second condition,
film supply means and third sensing means cooperating with said film supply means to sense positioning of an unexposed film frame in said film plane, and
means operative to return said memory means to said first condition on an operation of said third sensing means.

4. The camera of claim 3 which further includes fourth sensing means operatively associated with said shutter to sense when said shutter is fully opened,
supplementary light source energization means for supplying electrical energy for energization of said source,
selecting means to indicate whether a supplemental light source is necessary,
and means for energizing said supplemental light source means when said fourth sensing means senses said shutter in its fully opened position and said selecting means indicates a supplementary light source is necessary.

* * * * *